US012756642B2

(12) United States Patent
Parla et al.

(10) Patent No.: US 12,756,642 B2
(45) Date of Patent: Oct. 6, 2026

(54) HARDWARE ACCELERATION OF PROCESSING USING DECENTRALIZED PROCESSING UNIT SYSTEMS

(71) Applicant: Cisco Technology, Inc., San Jose, CA (US)

(72) Inventors: Vincent Parla, North Hampton, NH (US); Kyle Andrew Donald Mestery, Woodbury, MN (US)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 18/611,343

(22) Filed: Mar. 20, 2024

(65) Prior Publication Data

US 2025/0300914 A1 Sep. 25, 2025

(51) Int. Cl.
*G06F 15/173* (2006.01)
*H04L 43/028* (2022.01)
*H04L 43/065* (2022.01)

(52) U.S. Cl.
CPC .......... *H04L 43/065* (2013.01); *H04L 43/028* (2013.01)

(58) Field of Classification Search
CPC ....... H04L 41/06; H04L 43/04; H04L 43/062; H04L 9/3236; G06F 11/3065
See application file for complete search history.

(56) References Cited

U.S. PATENT DOCUMENTS 8,510,807 B1 * 8/2013 Elazary .................. G06Q 30/06 709/224
12,321,250 B1 * 6/2025 Dalgaard ............ G06F 11/3006
2017/0177396 A1 6/2017 Palermo et al.
2018/0027309 A1 * 1/2018 Friel ........................ H04Q 9/00 340/870.01
2019/0281132 A1 * 9/2019 Sethuraman .......... H04L 9/3247
2019/0394260 A1 12/2019 Caulfield et al.
2020/0159568 A1 5/2020 Goyal et al.
2021/0126847 A1 * 4/2021 Thiel .......................... G06F 9/54
2022/0014592 A1 * 1/2022 Kachare .................. H04L 67/51
2022/0244999 A1 8/2022 Smith et al.
2023/0179525 A1 * 6/2023 Pai .......................... H04L 43/10 709/223
2023/0244664 A1 8/2023 Choi et al.

* cited by examiner

*Primary Examiner* — Duyen M Doan
(74) *Attorney, Agent, or Firm* — Polsinelli P.C.

(57) ABSTRACT

Dedicated piece of hardware on a network may receive telemetry data from one or more network devices prior to transmission to a cloud-based server. The dedicated piece of hardware may identify duplicative records within the telemetry data. The dedicated piece of hardware may generate a reduced set of telemetry data that has the duplicative records removed. The dedicated piece of hardware may process the reduced set of telemetry data into a processed dataset. The dedicated piece of hardware may then send the processed dataset to the cloud server over the network.

20 Claims, 5 Drawing Sheets

HARDWARE ACCELERATION OF PROCESSING USING DECENTRALIZED PROCESSING UNIT SYSTEMS

TECHNICAL FIELD

The present disclosure relates generally to systems, methods, and computer-readable media for offloading processing of data, such as telemetry data, to a piece of dedicated hardware where hardware acceleration can be used.

BACKGROUND

As more cloud reporting ecosystems are built, large amounts of data are sent over the network to the cloud. By sending these large amounts of data over the network to the cloud, costs associated with the ingress of this data to the cloud host (e.g., AWS) increase. Moreover, some network environments having numerous workloads or tasks may send duplicative information to the cloud host, such that the cloud host inefficiently receives large amounts of duplicative data for processing, thereby increasing costs associated with the ingress of this data.

Furthermore, some current systems rely on the CPU to do this data processing before sending the data to the cloud host. However, processing this data at the CPU creates additional inefficiencies because the CPU is also used to run workloads and perform tasks on top of processing this data. These inefficiencies in cloud computing continue to grow as larger and more complex cloud reporting ecosystems are built.

BRIEF DESCRIPTION OF THE DRAWINGS

Details of one or more aspects of the subject matter described in this disclosure are set forth in the accompanying drawings and the description below. However, the accompanying drawings illustrate only some typical aspects of this disclosure and are therefore not to be considered limiting of its scope. Other features, aspects, and advantages will become apparent from the description, the drawings and the claims.

DESCRIPTION

Figure 1:
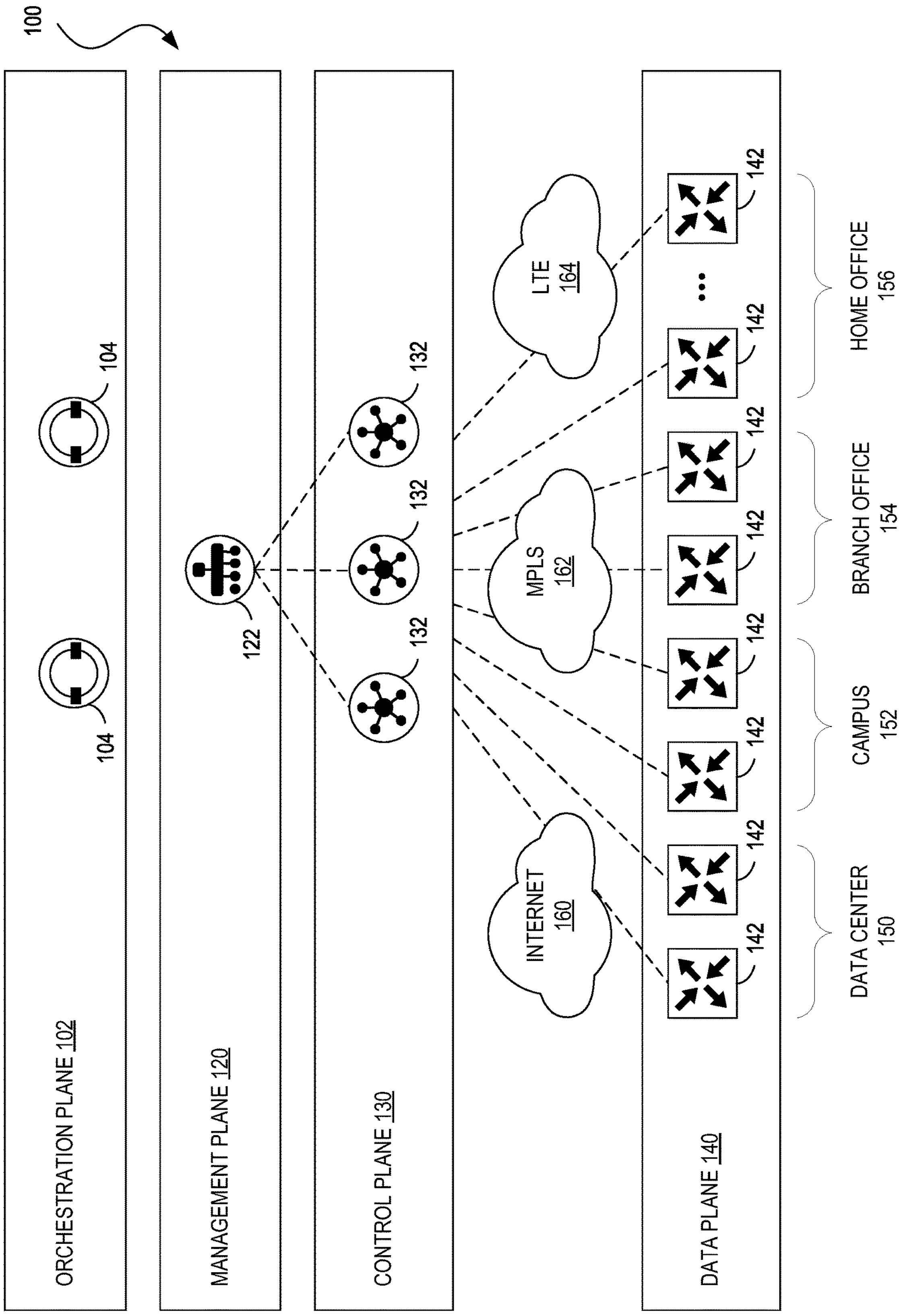
FIG. 1 illustrates an example of a high-level network architecture in accordance with an embodiment of the present technology.

The detailed description set forth below is intended as a description of various configurations of embodiments and is not intended to represent the only configurations in which the subject matter of this disclosure can be practiced. The appended drawings are incorporated herein and constitute a part of the detailed description. The detailed description includes specific details for the purpose of providing a more thorough understanding of the subject matter of this disclosure. However, it will be clear and apparent that the subject matter of this disclosure is not limited to the specific details set forth herein and may be practiced without these details. In some instances, structures and components are shown in block diagram form in order to avoid obscuring the concepts of the subject matter of this disclosure.

Overview

Systems, methods, and computer-readable media are provided for hardware acceleration of processing using decentralized processing unit systems. An example method can include: receiving, by a dedicated piece of hardware on a network, telemetry data from one or more network devices prior to transmission to a cloud-based server; identifying, by the dedicated piece of hardware, duplicative records within the telemetry data; generating, by the dedicated piece of hardware, a reduced set of telemetry data that has the duplicative records removed; processing, by the dedicated piece of hardware, the reduced set of telemetry data into a processed dataset; and sending, by the dedicated piece of hardware, the processed dataset to the cloud-based server over the network.

In some examples, the techniques described herein relate to a method, wherein the dedicated piece of hardware includes at least one of a Data Processing Unit (DPU), a Graphics Processing Unit (GPU), an Application-specific Integrated Circuit (ASIC), and a Field-programmable Gate Array (FPGA).

In some examples, the techniques described herein relate to a method, wherein the one or more network devices include a server.

In some examples, the techniques described herein relate to a method, wherein the dedicated piece of hardware is included in the server.

In some examples, the techniques described herein relate to a method, wherein the one or more network devices include a plurality of servers and at least one router.

In some examples, the techniques described herein relate to a method, wherein the dedicated piece of hardware is included in the at least one router.

In some examples, the techniques described herein relate to a method, wherein the plurality of servers includes a dedicated server, the dedicated server including the dedicated piece of hardware.

In some examples, the techniques described herein relate to a method, wherein the processed dataset provides a summary of the telemetry data offloaded to the dedicated piece of hardware.

An example system can include one or more processors and at least one computer-readable storage medium storing instructions which, when executed by the one or more processors, cause the one or more processors to: receive, by a dedicated piece of hardware on a network, telemetry data from one or more network devices prior to transmission to a cloud-based server; identify, by the dedicated piece of hardware, duplicative records within the telemetry data; generate, by the dedicated piece of hardware, a reduced set of telemetry data that has the duplicative records removed; process, by the dedicated piece of hardware, the reduced set of telemetry data into a processed dataset; and send, by the dedicated piece of hardware, the processed dataset to the cloud-based server over the network.

An example non-transitory computer-readable storage medium having stored therein instructions which, when executed by a processor, cause the processor to: receive, by a dedicated piece of hardware on a network, telemetry data from one or more network devices prior to transmission to a cloud-based server; identify, by the dedicated piece of hardware, duplicative records within the telemetry data; generate, by the dedicated piece of hardware, a reduced set of telemetry data that has the duplicative records removed; process, by the dedicated piece of hardware, the reduced set of telemetry data into a processed dataset; and send, by the dedicated piece of hardware, the processed dataset to the cloud-based server over the network.

EXAMPLE EMBODIMENTS

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Inefficiencies in cloud computing continue to grow as larger and more complex cloud reporting ecosystems are built. As more of these cloud computing systems are built, large amounts of data, including telemetry data, are sent over a network to the cloud, resulting in increased amounts of potentially duplicative data sent to the cloud host (e.g., AWS), increased processing of the data by the cloud host, and ultimately increased costs associated with the ingress of this data.

The disclosed technology relates to introducing a piece of dedicated hardware where hardware acceleration can be used, such that this data processing can be offloaded to the piece of dedicated hardware for pre-processing. Thus, the present technology offers an advantage because it frees up the CPU of a system to focus on running tasks and workloads instead of dedicating portions of its processing capabilities to pre-processing this data, while also reducing the amount of data that is ultimately sent over the network to the cloud. Thus, the present technology provides additional efficiency in processing this data, while significantly reducing the costs associated with the ingress of this data to the cloud-based systems.

The technology disclosed herein offloads data, such as telemetry data, to the piece of dedicated hardware for pre-processing before sending the data off to the cloud host. Thus, the CPU can continue running its workloads and tasks, while reducing the amounts of data being sent from the server(s) to the cloud over the network. Therefore, the disclosed technology provides efficiency to these types of computing systems, which ultimately should improve the ability of the system to capture and process data, such as data related to security events, as well as de-duplicate duplicative data prior to sending the data to the cloud host servers.

Turning to the figures, FIG. 1 illustrates an example of a network architecture 100 for implementing aspects of the present technology. An example of an implementation of the network architecture 100 is the Cisco® SD-WAN architecture. However, one of ordinary skill in the art will understand that, for the network architecture 100 and any other system discussed in the present disclosure, there can be additional or fewer component in similar or alternative configurations. The illustrations and examples provided in the present disclosure are for conciseness and clarity. Other embodiments may include different numbers and/or types of elements but one of ordinary skill the art will appreciate that such variations do not depart from the scope of the present disclosure.

In this example, the network architecture 100 can comprise an orchestration plane 102, a management plane 120, a control plane 130, and a data plane 140. The orchestration plane can 102 assist in the automatic on-boarding of edge network devices 142 (e.g., switches, routers, etc.) in an overlay network. The orchestration plane 102 can include one or more physical or virtual network orchestrator appliances 104. The network orchestrator appliance(s) 104 can perform the initial authentication of the edge network devices 142 and orchestrate connectivity between devices of the control plane 130 and the data plane 140. In some embodiments, the network orchestrator appliance(s) 104 can also enable communication of devices located behind Network Address Translation (NAT). In some embodiments, physical or virtual Cisco® SD-WAN vBond appliances can operate as the network orchestrator appliance(s) 104.

The management plane 120 can be responsible for central configuration and monitoring of a network. The management plane 120 can include one or more physical or virtual network management appliances 122. In some embodiments, the network management appliance(s) 122 can provide centralized management of the network via a graphical user interface to enable a user to monitor, configure, and maintain the edge network devices 142 and links (e.g., Internet transport network 160, MPLS network 162, 4G/LTE network 164) in an underlay and overlay network. The network management appliance(s) 122 can support multi-tenancy and enable centralized management of logically isolated networks associated with different entities (e.g., enterprises, divisions within enterprises, groups within divisions, etc.). Alternatively or in addition, the network management appliance(s) 122 can be a dedicated network management system for a single entity. In some embodiments, physical or virtual Cisco® SD-WAN vManage appliances can operate as the network management appliance(s) 122.

The control plane 130 can build and maintain a network topology and make decisions on where traffic flows. The control plane 130 can include one or more physical or virtual network controller appliance(s) 132. The network controller appliance(s) 132 can establish secure connections to each network device 142 and distribute route and policy information via a control plane protocol (e.g., Overlay Management Protocol (OMP) (discussed in further detail below), Open Shortest Path First (OSPF), Intermediate System to Intermediate System (IS-IS), Border Gateway Protocol (BGP), Protocol-Independent Multicast (PIM), Internet Group Management Protocol (IGMP), Internet Control Message Protocol (ICMP), Address Resolution Protocol (ARP), Bidirectional Forwarding Detection (BFD), Link Aggregation Control Protocol (LACP), etc.). In some embodiments, the network controller appliance(s) 132 can operate as route reflectors. The network controller appliance(s) 132 can also orchestrate secure connectivity in the data plane 140 between and among the edge network devices 142. For example, in some embodiments, the network controller appliance(s) 132 can distribute crypto key information among the network device(s) 142. This can allow the network to support a secure network protocol or application (e.g., Internet Protocol Security (IPSec), Transport Layer Security (TLS), Secure Shell (SSH), etc.) without Internet Key Exchange (IKE) and enable scalability of the network. In some embodiments, physical or virtual Cisco® SD-WAN vSmart controllers can operate as the network controller appliance(s) 132.

The data plane 140 can be responsible for forwarding packets based on decisions from the control plane 130. The data plane 140 can include the edge network devices 142, which can be physical or virtual network devices. The edge network devices 142 can operate at the edges various network environments of an organization, such as in one or more data centers or colocation centers 150, campus networks 152, branch office networks 154, home office networks 154, and so forth, or in the cloud (e.g., Infrastructure as a Service (IaaS), Platform as a Service (PaaS), SaaS, and other cloud service provider networks). The edge network devices 142 can provide secure data plane connectivity among sites over one or more WAN transports, such as via one or more Internet transport networks 160 (e.g., Digital Subscriber Line (DSL), cable, etc.), MPLS networks 162 (or other private packet-switched network (e.g., Metro Ethernet, Frame Relay, Asynchronous Transfer Mode (ATM), etc.), mobile networks 164 (e.g., 3G, 4G/LTE, 5G, etc.), or other WAN technology (e.g., Synchronous Optical Networking (SONET), Synchronous Digital Hierarchy (SDH), Dense Wavelength Division Multiplexing (DWDM), or other fiber-optic technology; leased lines (e.g., T1/E1, T3/E3, etc.); Public Switched Telephone Network (PSTN), Integrated Services Digital Network (ISDN), or other private circuit-switched network; small aperture terminal (VSAT) or other satellite network; etc.). The edge network devices 142 can be responsible for traffic forwarding, security, encryption, quality of service (QoS), and routing (e.g., BGP, OSPF, etc.), among other tasks. In some embodiments, physical or virtual Cisco® SD-WAN vEdge routers can operate as the edge network devices 142.

Figure 2:
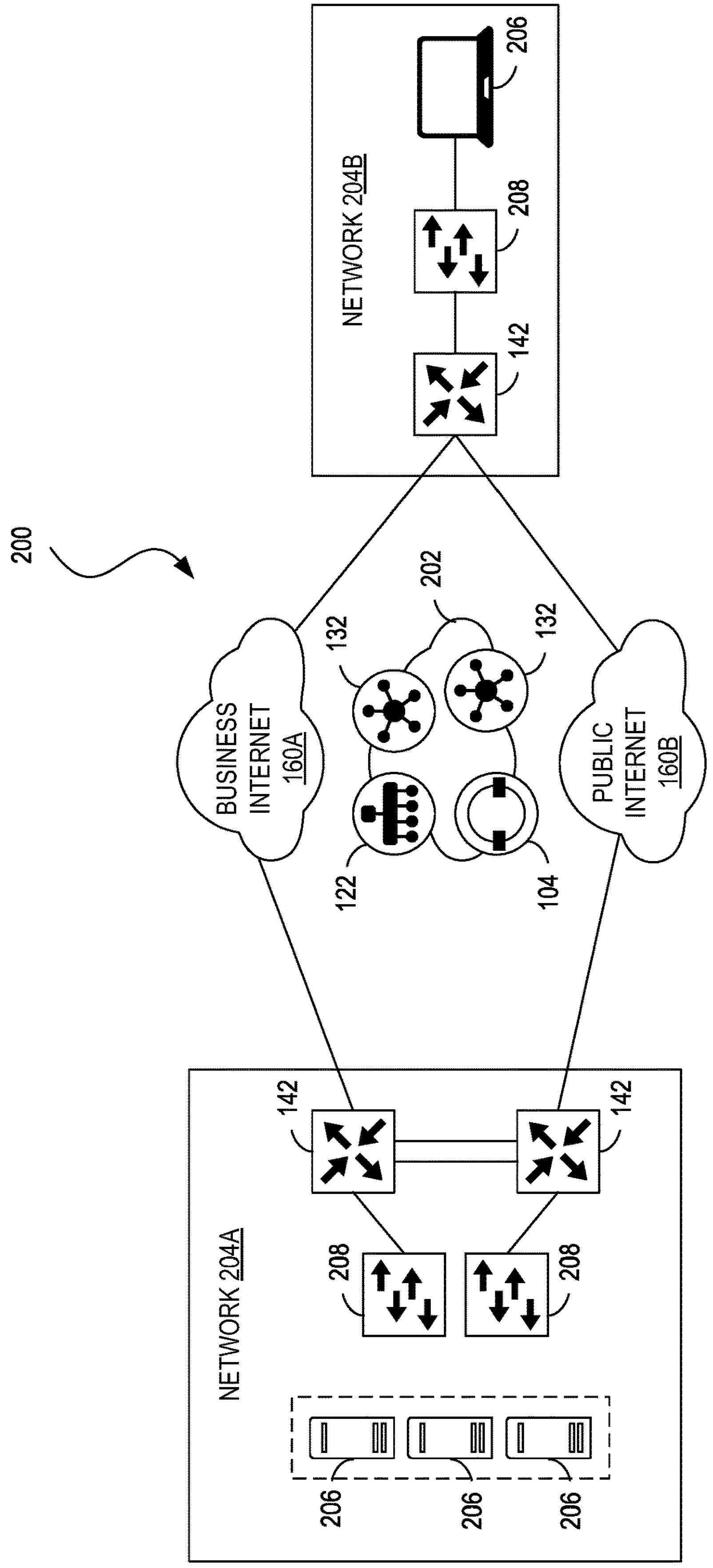
FIG. 2 illustrates an example of a network topology in accordance with some embodiments of the present technology.

FIG. 2 illustrates an example of a network topology 200 for showing various aspects of the network architecture 100. The network topology 200 can include a management network 202, a pair of network sites 204A and 204B (e.g., the data center(s) 150, the campus network(s) 152, the branch office network(s) 154, the home office network(s) 156, cloud service provider network(s), etc.), and a pair of Internet transport networks 160A and 160B (collectively, 160). The management network 202 can include one or more network orchestrator appliances 104, one or more network management appliance 122, and one or more network controller appliances 132. Although the management network 202 is shown as a single network in this example, one of ordinary skill in the art will understand that each element of the management network 202 can be distributed across any number of networks and/or be co-located with the sites 204A, 204B. In this example, each element of the management network 202 can be reached through either transport network 160A or 160B.

Each site can include one or more endpoints 206 connected to one or more site network devices 208. The endpoints 206 can include general purpose computing devices (e.g., servers, workstations, desktop computers, etc.), mobile computing devices (e.g., laptops, tablets, mobile phones, etc.), wearable devices (e.g., watches, glasses or other head-mounted displays (HMDs), ear devices, etc.), and so forth. The endpoints 206 can also include Internet of Things (IoT) devices or equipment, such as agricultural equipment (e.g., livestock tracking and management systems, watering devices, unmanned aerial vehicles (UAVs), etc.); connected cars and other vehicles; smart home sensors and devices (e.g., alarm systems, security cameras, lighting, appliances, media players, HVAC equipment, utility meters, windows, automatic doors, door bells, locks, etc.); office equipment (e.g., desktop phones, copiers, fax machines, etc.); healthcare devices (e.g., pacemakers, biometric sensors, medical equipment, etc.); industrial equipment (e.g., robots, factory machinery, construction equipment, industrial sensors, etc.); retail equipment (e.g., vending machines, point of sale (POS) devices, Radio Frequency Identification (RFID) tags, etc.); smart city devices (e.g., street lamps, parking meters, waste management sensors, etc.); transportation and logistical equipment (e.g., turnstiles, rental car trackers, navigational devices, inventory monitors, etc.); and so forth.

The site network devices 208 can include physical or virtual switches, routers, and other network devices. Although the site 204A is shown including a pair of site network devices and the site 204B is shown including a single site network device in this example, the site network devices 208 can comprise any number of network devices in any network topology, including multi-tier (e.g., core, distribution, and access tiers), spine-and-leaf, mesh, tree, bus, hub and spoke, and so forth. For example, in some embodiments, one or more data center networks may implement the Cisco® Application Centric Infrastructure (ACI) architecture and/or one or more campus networks may implement the Cisco® Software Defined Access (SD-Access or SDA) architecture. The site network devices 208 can connect the endpoints 206 to one or more edge network devices 142, and the edge network devices 142 can be used to directly connect to the transport networks 160.

In some embodiments, "color" can be used to identify an individual WAN transport network, and different WAN transport networks may be assigned different colors (e.g., mpls, private1, biz-internet, metro-ethernet, lte, etc.). In this example, the network topology 200 can utilize a color called "biz-internet" for the Internet transport network 160A and a color called "public-internet" for the Internet transport network 160B.

In some embodiments, each edge network device 208 can form a Datagram Transport Layer Security (DTLS) or TLS control connection to the network controller appliance(s) 132 and connect to any network control appliance 132 over each transport network 160. In some embodiments, the edge network devices 142 can also securely connect to edge network devices in other sites via IPSec tunnels. In some embodiments, the BFD protocol may be used within each of these tunnels to detect loss, latency, jitter, and path failures.

On the edge network devices 142, color can be used help to identify or distinguish an individual WAN transport tunnel (e.g., no same color may be used twice on a single edge network device). Colors by themselves can also have significance. For example, the colors metro-ethernet, mpls, and private1, private2, private3, private4, private5, and private6 may be considered private colors, which can be used for private networks or in places where there is no NAT addressing of the transport IP endpoints (e.g., because there may be no NAT between two endpoints of the same color). When the edge network devices 142 use a private color, they may attempt to build IPSec tunnels to other edge network devices using native, private, underlay IP addresses. The public colors can include 3g, biz, internet, blue, bronze, custom1, custom2, custom3, default, gold, green, lte, public-internet, red, and silver. The public colors may be used by the edge network devices 142 to build tunnels to post-NAT IP addresses (if there is NAT involved). If the edge network devices 142 use private colors and need NAT to communicate to other private colors, the carrier setting in the configuration can dictate whether the edge network devices 142 use private or public IP addresses. Using this setting, two private colors can establish a session when one or both are using NAT.

Figure 3:
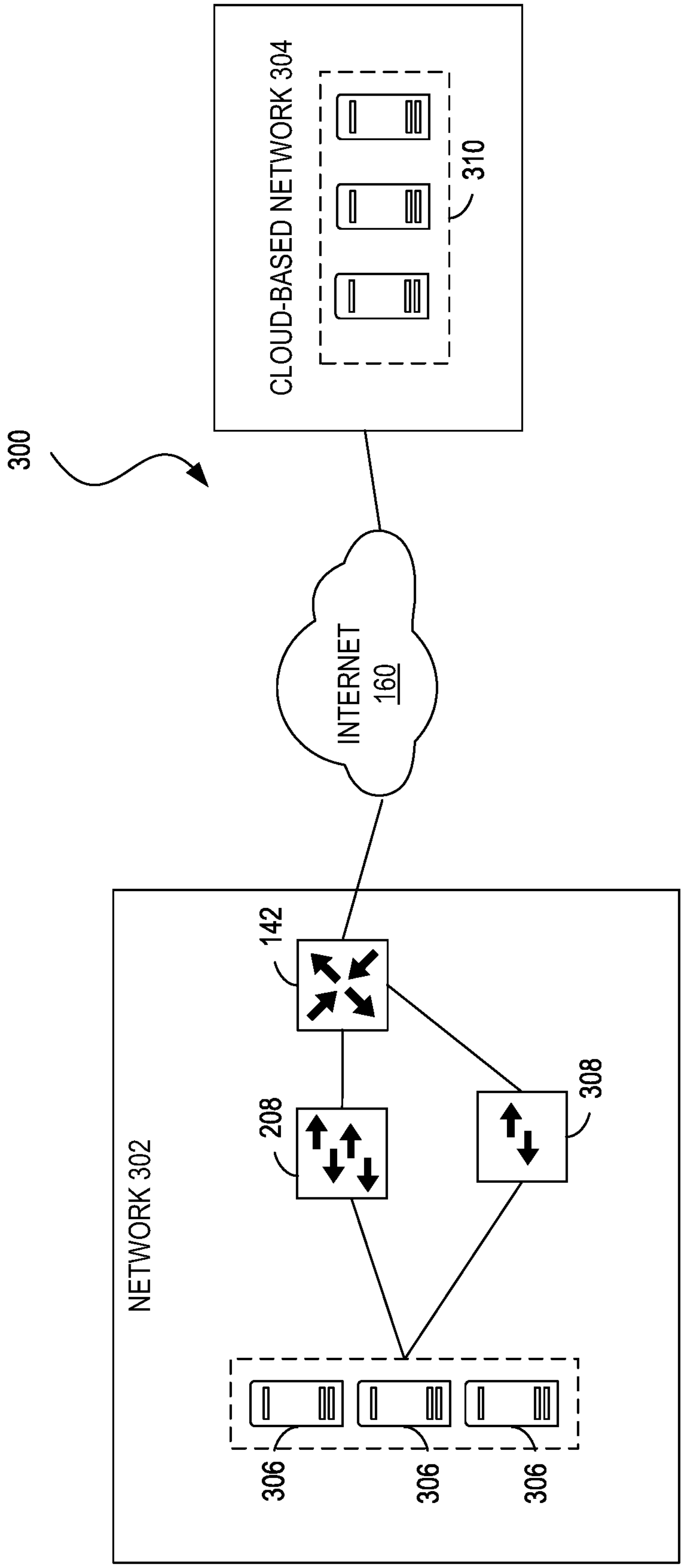
FIG. 3 illustrates an example of the network topology for hardware acceleration in accordance with some embodiments of the present technology.

FIG. 3 illustrates an example of the network topology 300 for a network 302 having a piece of dedicated hardware 308 to perform hardware acceleration on data prior to ingress of the data into a cloud-based network 304. As described above, the processing of data, such as telemetry data, previously occurred at CPUs of endpoints 306 of the network 302, or at data collectors 310 of the cloud-based network 304. However, as discussed above, processing of this data at the endpoints 306 or data collectors 310 created significant inefficiencies, which ultimately increases processing requirements and costs associated with the ingress of the data.

These inefficiencies are especially relevant to telemetry data, or any type of data that provides contextual information about the flows or applications in the network, such as network telemetry data (e.g., source/destination data, ports, etc.), or other data related to flow size and packets per second rates of data flows. This type of data can be used for usability, performance, security, observability, etc. To illustrate, OpenTelemetry ("OTEL") is a well known observability framework for generating and capturing telemetry data from cloud-native software, and is commonly used in industry. However, this OTEL data can have a lot of duplicate data because the way OTEL builds streams is based on something called a span, which can include a lot of repetitive data that is structured to take advantage of hardware acceleration. Hardware acceleration can be used, e.g., for data deduplication and compression, using regular expressions (regex) to reduce the data. For example, when there are multiple independent servers in a system, they're all reporting similar data, much of which is redundant and can be removed by pre-processing the data in a piece of dedicated hardware 308 before sending reduced data upstream to the cloud based network 304, such as an cloud OTEL server. The amount of duplicative telemetry data only increases with the increased complexity of the network 302. Attempting to process this large amount of duplicative telemetry data at the CPU of the endpoints 306 reduce the capacity of the endpoints 306 to perform other workflows and/or tasks, while sending this large amount of duplicative telemetry data from the network 302 across the transport networks 160 to the cloud-based network 304 requires the data collectors 310, such as an OTEL collector, to perform the processing on this duplicative telemetry data. While the concepts disclosed herein may be used for various types of data, the focus herein will be on offloading telemetry data to the piece of dedicated hardware 308 for hardware acceleration.

Turning back to FIG. 3, instead of the CPU of the endpoints 306 or data collectors 310 of the cloud-based network 304 processing the telemetry data, this telemetry data is offloaded to the piece of dedicated hardware 308 for pre-processing prior to sending across the transport networks 160 to the cloud-based network 304. In particular, custom pipelines can be created between the endpoints 306, piece of dedicated hardware 308, and edge network devices 142 to process those strings and take on a lot of the processing that would be performed by the data collectors 310 or endpoints 306. The dedicated piece of hardware 308 may be any piece of hardware where hardware acceleration may be used, including but not limited to a data processing unit (DPU), a graphics processing unit (GPU), an application-specific integrated circuit (ASIC), or a field-programmable gate array (FPGA). Thus, offloading the telemetry data to the piece of dedicated hardware 308 enables the network 302 to efficiently pre-process and de-duplicate the telemetry data prior to ingress of the telemetry data into the cloud-based network 304.

In some embodiments, the piece of dedicated hardware 308 performing these processes can be located on a network device generating the telemetry data within the network 302, rather than on the cloud-based network 304, thereby decreasing the bandwidth required to stream the telemetry data from the generating network device to the cloud-based network 304. In some other embodiments, some of the telemetry data may not be used by the cloud-based network 304 but is instead transmitted to a third location other than the generating network device and/or the cloud-based network 304. Processing the telemetry data on the generating network device, rather than the cloud-based network 304, has the benefit that at least part of the telemetry data can be streamed directly to the third location where it is used, rather than being transmitted first to the cloud-based network 304 for processing and then from the cloud-based network 304 to the third location where it is being used.

To illustrate, network topology 300 can include the data collector 310 (e.g., an OTEL collector) that collects all log files and scans and information. Additionally, the network topology 300 can include a reporting application that creates visualizations, graphs, or reports based on that data. This can be, for example, a normal sym-type ecosystem that generates reports and consumes this telemetry data. By pre-processing some or all of the telemetry data in the piece of dedicated hardware 308 instead of doing it at the data collector 310 (e.g., OTEL collector), the piece of dedicated hardware 308 can perform de-duplication and MapReduce functions, among others, then send a summary to the upstream data collector 310. Consider the example of a Kubernetes cluster with 30 workloads that are all doing the same thing. Each of the Kubernetes cluster workloads all have agents running on them sending upstream telemetry data, and 90% of that data is duplicative across all of those workloads. The piece of dedicated hardware 308 performs de-duplication and MapReduce functions on the telemetry data associated with each workload, and then sends a summary to the upstream data collector (e.g., OTEL collector) so that the data collector doesn't need to perform these functions. As another example, consider a Kubernetes environment running on a server producing telemetry, where there is a want to build a dependency graph mapping the Kubernetes internetworking relationship between the Kubernetes nodes. The concepts disclosed herein take the raw telemetry, offload the raw telemetry data to piece of dedicated hardware 308 on the server hosting the Kubernetes, and then builds the dependency graph on the piece of dedicated hardware 308 instead of sending it all to the cloud-based network 304 or use the CPU of the endpoints 306 of the network 302 to do the perform the same function.

In some embodiments, the concepts disclosed herein may be used with a single server having multiple processes running, or may have multiple servers performing multiple processes. In the single server embodiment with multiple processes running, the server itself may have the piece of dedicated hardware 308, and instead of sending the telemetry data straight from each Kubernetes node on the server to the cloud-based network 304, the telemetry data is sent to the piece of dedicated hardware 308 for pre-processing. The piece of dedicated hardware 308 then pre-processes and summarizes the telemetry data received from each of the Kubernetes nodes prior to delivering it to the cloud-based network 304.

In other embodiments having multiple servers, an edge network device 142 may have the piece of dedicated hardware 308 running on it, or a separate node having the piece of dedicated hardware 308 may be designated for pre-processing, such as the separate node having the piece of dedicated hardware 308 illustrated in FIG. 3. In the edge network device 142 example, because each of the servers (e.g., endpoints 306) send data through the edge network device 142 (e.g., a router), that edge network device 142 may include the piece of dedicated hardware 308 to capture the telemetry data running through the edge network device 142 for pre-processing. This solution provides an advantage for embodiments having multiple servers, as instead of sending off the telemetry data to another location outside the network 302 having the multiple servers for pre-processing, the pre-processing is performed on the piece of dedicated hardware 308 that is within the network 302 itself.

The technology disclosed herein provides numerous beneficial functions related to the efficient processing of telemetry data. For example, this technology may be used for security functions, de-duplication and summarization functions, and MapReduce functions discussed above. To illustrate, consider a security event that occurs consistently across numerous workloads on nodes of a server. If the same security event effects 20 workloads of the server, it would be redundant and inefficient to send a record of each identical security exploit 20 separate times to the cloud-based network 304. Instead, the data associated with each of the 20 security events is sent to the piece of dedicated hardware 308, which in turn summarizes the security events on each workload and sends the summary to the cloud-based network 304. This significantly reduces the amount of data sent from the network 302 to the cloud-based network 304 regarding the security event.

To illustrate another example, consider a network with one hundred nodes that each are attempting to communicate with the same destination. Instead of sending one hundred individual records from each node providing that same destination, this data is offloaded to the piece of dedicated hardware 308 which summarizes the one hundred individual records into one record summary, then sends the summary regarding the destination upstream to the cloud-based network 304. This effectively de-duplicates the one hundred records to a single record, thereby reducing the data that needs to be processed by the data collectors 310 of the cloud-based network 304.

Figure 4:
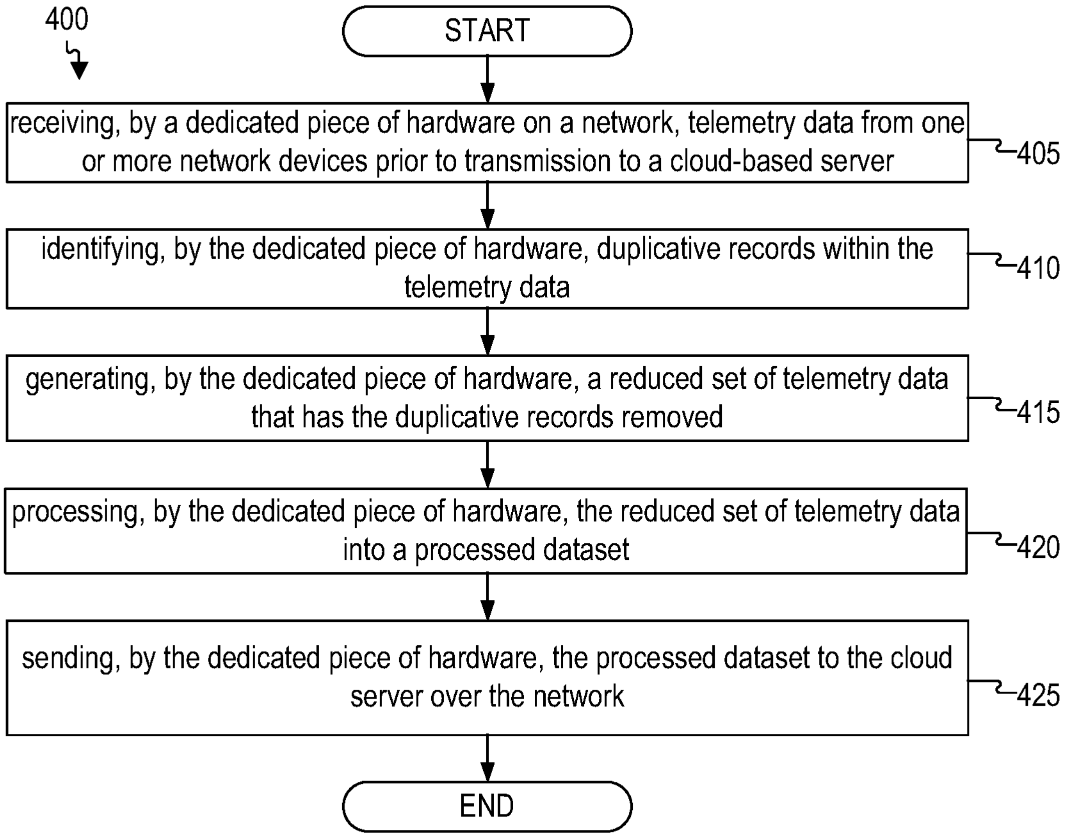
FIG. 4 illustrates a flow chart of a method for providing hardware acceleration of processing using decentralized processing unit systems in accordance with some embodiments of the present technology.

FIG. 4 illustrates an example method 400 for hardware acceleration of telemetry data using a piece of dedicated hardware. Although the example method 400 depicts a particular sequence of operations, the sequence may be altered without departing from the scope of the present disclosure. For example, some of the operations depicted may be performed in parallel or in a different sequence that does not materially affect the function of the method 400. In other examples, different components of an example device or system that implements the method 400 may perform functions at substantially the same time or in a specific sequence.

According to some examples, the method includes receiving, by a dedicated piece of hardware on a network, telemetry data from one or more network devices prior to transmission to a cloud-based server at block 405. For example, the piece of dedicated hardware 308 illustrated in FIG. 3 may receive telemetry data from one or more network devices prior to transmission to a cloud-based server. In some of these examples, the dedicated piece of hardware includes at least one of a Data Processing Unit (DPU), a Graphics Processing Unit (GPU), an Application-specific Integrated Circuit (ASIC), and a Field-programmable Gate Array (FPGA). In some of these examples, the at least one network device includes a server, and in some of these examples, the dedicated piece of hardware is included in the server. In some of these examples, the at least one network device includes a plurality of servers and at least one router. In some of these examples, the dedicated piece of hardware is included in the at least one router. In some of these examples, the plurality of servers includes a dedicated server, and the dedicated server includes the dedicated piece of hardware.

According to some examples, the method includes identifying, by the dedicated piece of hardware on the network, duplicative records within the telemetry data at block 410. For example, the piece of dedicated hardware 308 illustrated in FIG. 3 may identify duplicative records within the telemetry data.

According to some examples, the method includes generating, by the dedicated piece of hardware on the network, a reduced set of telemetry data that has the duplicative records removed at block 415. For example, the piece of dedicated hardware 308 illustrated in FIG. 3 may generate a reduced set of telemetry data that has the duplicative records removed.

According to some examples, the method includes processing, by the dedicated piece of hardware on the network, the reduced set of telemetry data into a processed dataset at block 420. For example, the piece of dedicated hardware 308 illustrated in FIG. 3 may process the reduced set of telemetry data into a processed dataset. In some examples, the processed telemetry dataset provides a summary of the telemetry data offloaded to the dedicated piece of hardware.

According to some examples, the method includes sending, by the dedicated piece of hardware on the network, the processed dataset to the cloud server over the network at block 425. For example, the piece of dedicated hardware 308 illustrated in FIG. 3 may send the processed dataset to the cloud server (e.g., cloud-based network 304 shown in FIG. 3) over the network.

Figure 5:
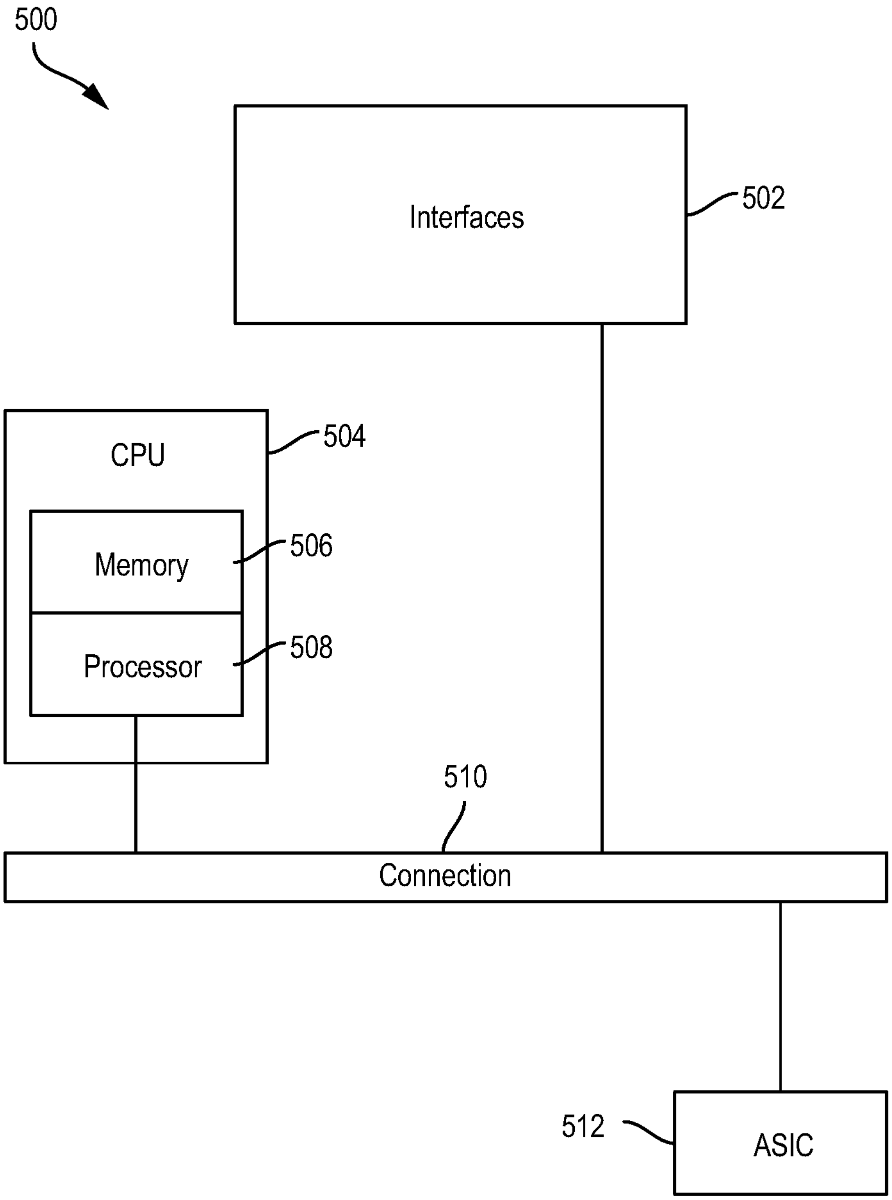
FIG. 5 illustrates an example network device in accordance with some embodiments of the present technology.

FIG. 5 illustrates an example network device 500 suitable for performing switching, routing, load balancing, and other networking operations. The example network device 500 can be implemented as switches, routers, nodes, metadata servers, load balancers, client devices, and so forth.

Network device 500 includes a central processing unit (CPU) 504, interfaces 502, and a bus 510 (e.g., a PCI bus). When acting under the control of appropriate software or firmware, the CPU 504 is responsible for executing packet management, error detection, and/or routing functions. The CPU 504 preferably accomplishes all these functions under the control of software including an operating system and any appropriate applications software. CPU 504 may include one or more processors 508, such as a processor from the INTEL X86 family of microprocessors. In some cases, processor 508 can be specially designed hardware for controlling the operations of network device 500. In some cases, a memory 506 (e.g., non-volatile RAM, ROM, etc.) also forms part of CPU 504. However, there are many different ways in which memory could be coupled to the system.

The interfaces 502 are typically provided as modular interface cards (sometimes referred to as "line cards"). Generally, they control the sending and receiving of data packets over the network and sometimes support other peripherals used with the network device 500. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communication intensive tasks, these interfaces allow the master CPU (e.g., 504) to efficiently perform routing computations, network diagnostics, security functions, etc.

Although the system shown in FIG. 5 is one specific network device of the present disclosure, it is by no means the only network device architecture on which the present disclosure can be implemented. For example, an architecture having a single processor that handles communications as well as routing computations, etc., is often used. Further, other types of interfaces and media could also be used with the network device 500.

Regardless of the network device's configuration, it may employ one or more memories or memory modules (including memory 506) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. Memory 506 could also hold various software containers and virtualized execution environments and data.

The network device 500 can also include an application-specific integrated circuit (ASIC) 512, which can be configured to perform routing and/or switching operations. The ASIC 512 can communicate with other components in the network device 500 via the bus 510, to exchange data and signals and coordinate various types of operations by the network device 500, such as routing, switching, and/or data storage operations, for example.

Embodiments of the present disclosure, for example, are described above with reference to block diagrams and/or operational illustrations of methods, systems, and computer program products according to embodiments of the disclosure. The functions/acts noted in the blocks may occur out of the order as shown in any flowchart. For example, two blocks shown in succession may in fact be executed substantially concurrently or the blocks may sometimes be executed in the reverse order, depending upon the functionality/acts involved.

While the specification includes examples, the disclosure's scope is indicated by the following claims. Furthermore, while the specification has been described in language specific to structural features and/or methodological acts, the claims are not limited to the features or acts described above. Rather, the specific features and acts described above are disclosed as example for embodiments of the disclosure.

Aspect 1. A method comprising: receiving, by a dedicated piece of hardware on a network, telemetry data from one or more network devices prior to transmission to a cloud-based server; identifying, by the dedicated piece of hardware, duplicative records within the telemetry data; generating, by the dedicated piece of hardware, a reduced set of telemetry data that has the duplicative records removed; processing, by the dedicated piece of hardware, the reduced set of telemetry data into a processed dataset; and sending, by the dedicated piece of hardware, the processed dataset to the cloud-based server over the network.

Aspect 2. The method of aspect 1, wherein the dedicated piece of hardware includes at least one of a Data Processing Unit (DPU), a Graphics Processing Unit (GPU), an Application-specific Integrated Circuit (ASIC), and a Field-programmable Gate Array (FPGA).

Aspect 3. The method of aspect 1, wherein the one or more network devices include a server.

Aspect 4. The method of aspect 3, wherein the dedicated piece of hardware is included in the server.

Aspect 5. The method of aspect 1, wherein the one or more network devices include a plurality of servers and at least one router.

Aspect 6. The method of aspect 5, wherein the dedicated piece of hardware is included in the at least one router.

Aspect 7. The method of aspect 5, wherein the plurality of servers includes a dedicated server, the dedicated server including the dedicated piece of hardware.

Aspect 8. The method of aspect 1, wherein the processed dataset provides a summary of the telemetry data offloaded to the dedicated piece of hardware.

Aspect 9. A system comprising: a storage configured to store instructions; and a processor configured to execute the instructions and cause the processor to: receive, by a dedicated piece of hardware on a network, telemetry data from one or more network devices prior to transmission to a cloud-based server; identify, by the dedicated piece of hardware, duplicative records within the telemetry data; generate, by the dedicated piece of hardware, a reduced set of telemetry data that has the duplicative records removed; process, by the dedicated piece of hardware, the reduced set of telemetry data into a processed dataset; and send, by the dedicated piece of hardware, the processed dataset to the cloud-based server over the network.

Aspect 10. The system of aspect 9, wherein the dedicated piece of hardware includes at least one of a Data Processing Unit (DPU), a Graphics Processing Unit (GPU), an Application-specific Integrated Circuit (ASIC), and a Field-programmable Gate Array (FPGA).

Aspect 11. The system of aspect 9, wherein the one or more network devices include a server.

Aspect 12. The system of aspect 11, wherein the dedicated piece of hardware is included in the server.

Aspect 13. The system of aspect 9, wherein the one or more network devices include a plurality of servers and at least one router.

Aspect 14. The system of aspect 13, wherein the dedicated piece of hardware is included in the at least one router.

Aspect 15. The system of aspect 13, wherein the plurality of servers includes a dedicated server, the dedicated server including the dedicated piece of hardware.

Aspect 16. The system of aspect 9, wherein the processed dataset provides a summary of the telemetry data offloaded to the dedicated piece of hardware.

Aspect 17. A non-transitory computer readable medium comprising instructions, the instructions, when executed by a computing system, cause the computing system to: receive, by a dedicated piece of hardware on a network, telemetry data from one or more network devices prior to transmission to a cloud-based server; identify, by the dedicated piece of hardware, duplicative records within the telemetry data; generate, by the dedicated piece of hardware, a reduced set of telemetry data that has the duplicative records removed; process, by the dedicated piece of hardware, the reduced set of telemetry data into a processed dataset; and send, by the dedicated piece of hardware, the processed dataset to the cloud-based server over the network.

Aspect 18. The computer readable medium of aspect 17, wherein the dedicated piece of hardware includes at least one of a Data Processing Unit (DPU), a Graphics Processing Unit (GPU), an Application-specific Integrated Circuit (ASIC), and a Field-programmable Gate Array (FPGA).

Aspect 19. The computer readable medium of aspect 17, wherein the one or more network devices include a server.

Aspect 20. The computer readable medium of aspect 19, wherein the dedicated piece of hardware is included in the server.

What is claimed is:

1. A method comprising:

receiving, by a dedicated piece of hardware on a network from one or more network devices though a custom pipeline to an edge of the network, telemetry data from the one or more network devices for pre-processing prior to transmission to a cloud-based server, wherein the telemetry data is offloaded from other devices on the network to the dedicated piece of hardware and the dedicated piece of hardware is configured for hardware acceleration, wherein the custom pipeline is configured to route the telemetry data from the one or more network devices to the dedicated piece of hardware via a routing path that bypasses or is separate from a general data forwarding path;

identifying, by the dedicated piece of hardware, duplicative records within the telemetry data;

generating, by the dedicated piece of hardware, a reduced set of telemetry data that has the duplicative records removed;

processing, by the dedicated piece of hardware, the reduced set of telemetry data into a processed dataset; and sending, by the dedicated piece of hardware, the processed dataset to the cloud-based server over the network.

2. The method of claim 1, wherein the dedicated piece of hardware includes at least one of a Data Processing Unit (DPU), a Graphics Processing Unit (GPU), an Application-specific Integrated Circuit (ASIC), and a Field-programmable Gate Array (FPGA).

3. The method of claim 1, wherein the one or more network devices include a server.

4. The method of claim 3, wherein the dedicated piece of hardware is included in the server.

5. The method of claim 1, wherein the one or more network devices includes a plurality of servers and at least one router.

6. The method of claim 5, wherein the dedicated piece of hardware is included in the at least one router.

7. The method of claim 5, wherein the plurality of servers includes a dedicated server, the dedicated server including the dedicated piece of hardware.

8. The method of claim 1, wherein the processed dataset provides a summary of the telemetry data offloaded to the dedicated piece of hardware.

9. A system comprising:

a storage configured to store instructions; and a hardware processor configured to execute the instructions and cause the processor to: receive, by a dedicated piece of hardware on a network from one or more network devices though a custom pipeline to an edge of the network, telemetry data from the one or more network devices for pre-processing prior to transmission to a cloud-based server, wherein the telemetry data is offloaded from other devices on the network to the dedicated piece of hardware and the dedicated piece of hardware is configured for hardware acceleration, wherein the custom pipeline is configured to route the telemetry data from the one or more network devices to the dedicated piece of hardware via a routing path that bypasses or is separate from a general data forwarding path;

identify, by the dedicated piece of hardware, duplicative records within the telemetry data;

generate, by the dedicated piece of hardware, a reduced set of telemetry data that has the duplicative records removed;

process, by the dedicated piece of hardware, the reduced set of telemetry data into a processed dataset; and send, by the dedicated piece of hardware, the processed dataset to the cloud-based server over the network.

10. The system of claim 9, wherein the dedicated piece of hardware includes at least one of a Data Processing Unit (DPU), a Graphics Processing Unit (GPU), an Application-specific Integrated Circuit (ASIC), and a Field-programmable Gate Array (FPGA).

11. The system of claim 9, wherein the one or more network devices include a server.

12. The system of claim 11, wherein the dedicated piece of hardware is included in the server.

13. The system of claim 9, wherein the one or more network devices include a plurality of servers and at least one router.

14. The system of claim 13, wherein the dedicated piece of hardware is included in the at least one router.

15. The system of claim 13, wherein the plurality of servers includes a dedicated server, the dedicated server including the dedicated piece of hardware.

16. The system of claim 9, wherein the processed dataset provides a summary of the telemetry data offloaded to the dedicated piece of hardware.

17. A non-transitory computer readable medium comprising instructions, the instructions, when executed by a computing system, cause the computing system to:

receive, by a dedicated piece of hardware on a network from one or more network devices though a custom pipeline to an edge of the network, telemetry data from the one or more network devices for pre-processing prior to transmission to a cloud-based server, wherein the telemetry data is offloaded from other devices on the network to the dedicated piece of hardware and the dedicated piece of hardware is configured for hardware acceleration, wherein the custom pipeline is configured to route the telemetry data from the one or more network devices to the dedicated piece of hardware via a routing path that bypasses or is separate from a general data forwarding path;

identify, by the dedicated piece of hardware, duplicative records within the telemetry data;

generate, by the dedicated piece of hardware, a reduced set of telemetry data that has the duplicative records removed;

process, by the dedicated piece of hardware, the reduced set of telemetry data into a processed dataset; and send, by the dedicated piece of hardware, the processed dataset to the cloud-based server over the network.

18. The non-transitory computer readable medium of claim 17, wherein the dedicated piece of hardware includes at least one of a Data Processing Unit (DPU), a Graphics Processing Unit (GPU), an Application-specific Integrated Circuit (ASIC), and a Field-programmable Gate Array (FPGA).

19. The non-transitory computer readable medium of claim 17, wherein the one or more network devices include a server.

20. The non-transitory computer readable medium of claim 19, wherein the dedicated piece of hardware is included in the server.

* * * * *